United States Patent [19]
Back et al.

[11] 3,875,139
[45] Apr. 1, 1975

[54] HEAVY METAL COMPLEXES OF AZO DYESTUFFS CONTAINING THE RESIDUE OF A 2-AMINO-3-HYDROXYPYRIDINE

[75] Inventors: Gerhard Back, Loerrach, Germany; Arthur Buehler, Rheinfelden, Switzerland

[73] Assignee: Ciba-Geigy AG, Basel, Switzerland

[22] Filed: July 24, 1972

[21] Appl. No.: 274,148

[30] Foreign Application Priority Data
July 27, 1971 Switzerland.................. 11035/71

[52] U.S. Cl................ 260/146 R, 8/42 R, 8/42 A, 8/42 B, 260/146 D, 260/146 T, 260/147, 260/155, 260/156
[51] Int. Cl.. C09b 45/14, C09b 45/16, C09b 45/24
[58] Field of Search..... 260/146 R, 156, 147, 146 T

[56] References Cited
UNITED STATES PATENTS
3,725,383    4/1973    Austin et al................. 260/146 R FOREIGN PATENTS OR APPLICATIONS
561,054    5/1944    United Kingdom........... 260/146 R

*Primary Examiner*—Henry R. Jiles
*Assistant Examiner*—Robert w. Ramsuer
*Attorney, Agent, or Firm*—Joseph G. Kolodny; Edward McC. Roberts; Prabodh I. Almaula

[57] ABSTRACT

Heavy metal complexes of azo compounds of formula

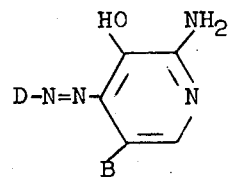

where D is the residue of a heterocyclic diazo component which can form a complex with a heavy metal, such as 8-quinolinyl, and B is hydrogen or halogen, provide dyeings on, for example, natural and synthetic polyamide and polyacrylonitrile which yield level blue and green shades of good general fastness, including resistance to acid, alkali, light and rubbing.

5 Claims, No Drawings

HEAVY METAL COMPLEXES OF AZO DYESTUFFS CONTAINING THE RESIDUE OF A 2-AMINO-3-HYDROXYPYRIDINE

The present invention relates to heavy metal complexes of azo compounds which contain as radical of the diazo components a heterocyclic radical which possesses a complex-forming position separated from the azo group by one or two atoms, and, as coupling component, the radical of a 2-amino-3-hydroxypyridine or a 5-halogeno-2-amino-3-hydroxypyridine.

The compounds of the invention are heavy metal complexes of azo compounds of the formula

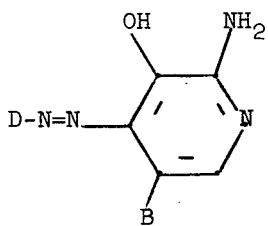

wherein B is hydrogen chlorine or bromine and D is the residue of a heterocyclic diazo component which can form a complex with a heavy metal so that D can represent, for example, pyridyl; benzthiazolyl or benzthiazolyl substituted by methoxy, nitro or chloro; indazolyl or indazolyl substituted by chloro or nitro; triazolyl or triazolyl substituted by carboxyl; benthriazolyl or benztriazolyl substituted by sulfo; pyrazolyl or pyrazolyl substituted by methyl and phenyl; benzimidazolyl or benzimidazolyl substituted by chloro; thiazolyl or thiazolyl substituted by methyl or nitro; pyrazolyl-5-one or pyrazolyl-5-one substituted by methyl or methyl and phenyl; quinolinyl or quinolinyl substituted by sulfo, chloro, bromo, acetylamino, methyl, sulfophenylazo or sulfophenylazo where the phenyl moiety contains a fiber-reactive group bound via an amino group; acridinyl; carbazolyl; 1,2,4-thiadiazolyl or 1,2,4-thiadiazolyl substituted by pyridyl or phenyl; 1,3,4-thiadiazolyl or 1,3,4-thiadiazolyl substituted by phenyl, methylthio, ethylthio, phenylthio, cyclohexylthio, phenylsulphonyl, methylsulphonyl, methyl, chloro, acetylamino, or carbomethoxyethyl; benzisothiazolyl or benzisothiazolyl substituted by methyl, ethyl, methoxy, chloro, bromo, cyano nitro, methylsulphonyl, N-methylsulfonamide and N,N-dimethylsulfonamide.

Suitable complex-forming positions are ionisable comples-forming groups, e.g. hydroxy, carboxy, alkoxy or amino groups, and, above all, non-ionisable coordinate positions, e.g. nitrogen atoms.

The one or two atoms separating the azo group from the complex-forming position may be heteroatoms bonded in or at the ring, e.g. oxygen or sulphur atoms, or preferably carbon atoms.

Particular importance attaches to heavy metal complexes of azo compounds, wherein three ring atoms of the heterocyclic diazo component, together with the azo bridge, form in one of the possible contributing or tautomeric forms a system of conjugated double bonds of the structure

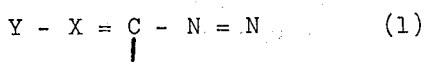

wherein one of the symbols X and Y represents a nitrogen atom and the other a nitrogen or carbon atom.

Suitable complex-forming groups are, for example, iron, cobalt, chromium, copper and nickel. The complexes may contain one or two molecules of a corresponding azo compound (1:1 and 1:2 complexes) for one atom of the complex-forming metal. However, both ligand molecules of a 1:2 complexes must correspond to the definition given hereinabove. The 1:2 cobalt, 1:2 nickel or 1:2 chromium and the 1:1 copper, 1:1 chromium or 1:1 nickel complex compounds are chiefly to be highlighted.

The heterocyclic diazo components are preferably 5-membered or 6-membered heterocyclic radicals. These radicals can, in particular, possess two or more hetero-atoms, above all nitrogen atoms, for example in the imidazole, thiadiazole or triazole radical, or they can contain a fused benzene radical, for example, in the quinoline radical. The azo group can be bonded to the heterocyclic structure itself or the fused radical which is free of hetero-atoms. The diazo radicals can contain further substituents, for example, halogen atoms, nitro, alkyl, alkoxy, aryl, phenyl, acylamino, carboxyl or arylazo groups and especially sulphonic acid groups and reactive radicals, above all reactive atoms bonded via amino groups or aliphatic carboxylic acid radicals containing reactive atom groups, for example, the α,β-dibromopropionyl or α-bromoacryl radical, bonded via amino groups.

The radical of the coupling component is preferably the radical of 2-amino-3-hydroxypyridine or of 5-chloro- or 5-bromo-2-amino-3-hydroxypyridine.

Products of interest are heavy metal complexes of azo compounds of the formula

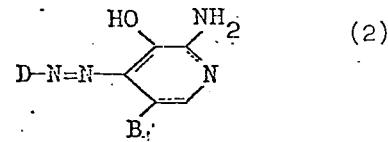

wherein D is a quinoline radical bonded in the 8-position and B is chlorine, bromine or hydrogen, and, in particular, heavy metal complexes of azo compounds which correspond to the formula

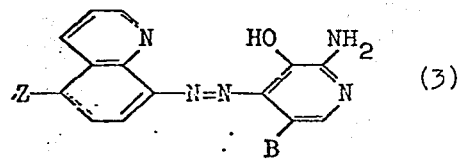

in which Z represents a halogen atom, for example a chlorine atom, a sulphonic acid group or acylamino group, such as the acetylamino group, or an arylazo group. A possible arylazo group is especially the phenylazo group, which preferably contains a reactive radical, as, for example, in the disazo compound of the formula

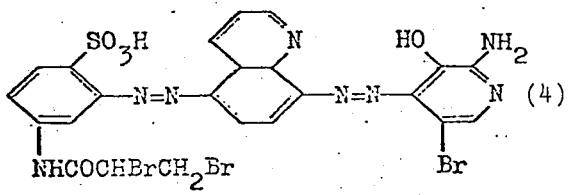

The diazo radicals which form a structure corresponding to the formula (1) need not contain any of the customary complex-forming groups such, for example, as hydroxyl, carboxyl or alkoxy groups, since the metal atom is coordinatively bonded, not only to the HO group of the radical of the coupling component and which is in the ortho-position to the azo group, but also the the azo group and to the nitrogen atom contained in the heterocyclic diazo radical and possessing a lone electron pair. In this way a metal atom, for example, forms a 5-membered and a 6-membered ring with a molecule of the formula (3), and correspondingly forms two 5-membered and two 6-membered rings with two molecules of the formula (3), these being structures which are distinguished by particular stability. The charge of the ion containing the metal atom depends on whether acid groups, especially sulphonic acid groups, or basic groups such, for example, as quaternised amino groups, are present.

Structures of the formula (1), wherein X represents a nitrogen atom and Y represents a carbon atom, are present e.g. in azo compounds which contain the radical of 2-amino-thiazole

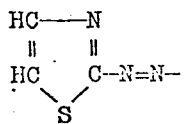

A corresponding azo compound, in which X and Y are nitrogen atoms, contains for example the radical of 5-amino-2-phenyl-1,3,4-thiadiazole

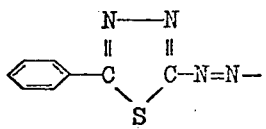

The case where X is a carbon atom and Y a nitrogen atom occurs in compounds which contain the radical of 8-amino-quinoline

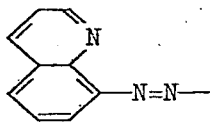

which, in the contributing form illustrated hereinabove, also has the structure corresponding to the formula (1) with two conjugated double bonds.

Among the heavy metal complexes according to the invention, interest attaches to both those which do not contain any water solubilising groups and, above all, those which are water soluble, e.g. sulphonic acid or carboxylic acid groups. In particular, the compounds may contain one or more than one reactive radical, which is contained especially in the diazo component.

Suitable reactive radicals are groupings capable of reaction with the hydroxyl groups of cellulose or the amino groups of polyamides to form a covalent chemical bond. Such a grouping is, in particular, a low molecular alkanoyl or alkylsulphonyl radical substituted by a removable atom or a removable group, a low molecular alkenoyl or alkenesulphonyl radical which is optionally substituted by a removable atom or a removable group, a carbocyclic or heterocyclic radical, containing 4-membered, 5-membered or 6-membered rings, which is bonded via a carbonyl or sulphonyl group and is substituted by a removable atom or a removable group, or a triazine or pyrimidine radical which is directly bonded via a carbon atom and is substituted by a removable atom or a removable group, or contains such a radical. The reactive radical of an aliphatic, saturated or unsaturated alkyl radical which preferably contains halogen atoms and is bonded via a —NH— group, in particular the $\alpha,\beta$-dibromopropionyl radical or $\alpha$-bromoacrylyl radical, is preferred.

The manufacture of the complex compounds according to the invention is carried out by reacting azo compounds of the type described with metal donors in such a way that metal complexes are produced which per molecule of azo compound contain one or a half atom of metal bonded as a complex. Accordingly, the metallisation is appropriately carried out with such metal donors and according to such methods as yield, according to experience, complex compounds of this composition.

The manufacture of 1:2-complexes can take place in a single reaction step, by reaction of 1 mol of a compound which donates a heavy metal with 2 mols of an appropriate azo compound, or can take place in stages. In the latter case, a corresponding azo compound, for example an azo compound of the formula (3), is reacted with a metal-donating agent to give a 1:1-complex, and this is subsequently reacted with an equivalent quantity of a corresponding metal-free azo compound to give the 1:2-complex. This procedure is advisable particularly if 1:2-complexes with different ligands are to be manufactured; but they must both correspond to the definition given initially.

Instead of reacting a 1:1 chromium complex compound with a suitable second component, as described above, in a molar ratio of 1:1, it is also possible to react the nonmetallised azo compounds used as starting substances, in a molar ratio of 1:1, simultaneously with a metal donor in a solvent mixture, this constituting so-called mixed metallisation.

The reaction with the heavy metal donor takes place according to customary processes, in various solvents such as, for example, water, ethanol, formamide, glycol ethers, pyridine and others, depending on the solubility of the components, optionally at elevated temperature, in a weakly acid to alkaline medium.

The reaction is advantageously carried out with warming, in an open vessel or under pressure, optionally in the presence of suitable additives, for example, salts of organic acids, of bases or of other agents which promote complex formation.

Particularly valuable complex compounds are obtained if copper (II) salts, nickel (II) salts, or cobalt (II) salts are used as metal donors.

As copper donors it is for example possible to use salts which contain copper as a cation, for example, copper sulphate or copper acetate. In some cases the use of complex copper compounds is of advantage, for example in the form of copper-ammine complexes, such as copper tetrammine sulphates from copper sulphate and ammonia, pyridine or monoethanolamine, or in the form of compounds which contain the copper bonded as a complex, for example complex copper compounds of the alkali salts of aliphatic aminocarboxylic acids, hydroxycarboxylic acids or dicarboxylic acids, such as of glycine, of glycollic acid, of lactic acid, of oxalic acid and above all of tartaric acid, such as sodium copper tartrate, of aliphatic tricarboxylic acids, such as citric acid, or aromatic hydroxycarboxylic acids, such as, for example, of salicylic acid.

The treatment with a copper donor can take place according to methods which are in themselves known, for example at room temperature if dealing with easily metallisable starting compounds, or by warming to temperatures between 50° and 120° in an open vessel, for example under reflux cooling, or optionally in a closed vessel under pressure, the pH conditions being determined by the type of metallisation process chosen; for example, copper is introduced under acid conditions with copper sulphate, and under alkaline conditions with copper tetrammine sulphate. If desired, solvents, such as, for example, alcohol, dimethylformamide and the like can also be added during the metallisation.

The above also applies to the treatment with nickel or cobalt donors.

When converting to the metal complexes, a unitary azo compound is preferentially employed as the starting substance.

The azo compounds which are used as starting products are manufactured by coupling diazotised primary heterocyclic amines with 2-amino-3-hydroxypyridine or a 5-halogeno-2-amino-3-hydroxypyridine.

The diazotisation of the amine takes place according to methods which are in themselves known, for example with the aid of hydrochloric acid and sodium nitrite. The coupling with 2-amino-3-hydroxypyridine or a 5-halogeno-2,3-dihydroxy-pyridine also takes place according to methods which are in themselves known, in an acid to alkaline medium.

After completion of the coupling reaction, the compounds can, for metallisation purposes, be isolated from the coupling mixture by filtration. They are conveniently used as a filter cake without intermediate drying. In many cases it is also possible to carry out the treatment with the metal donors directly in the coupling mixture, without intermediate separation.

The diazo components can be substituted further, for example by chlorine or bromine atoms, nitro, cyano, lower alkyl, preferably methyl, lower alkoxy, preferably methoxy, lower alkylsulphonyl, such as methylsulphonyl and ethylsulphonyl, sulphonic acid, carboxylic acid, sulphonamide and substituted sulphonamide, for example N-lower alkyl-sulphonamide and N-lower hydroxyalkylsulphonamide, for example N-methylsulphonamide, N,N-diethylsulphonamide, N-(β-hydroxyethyl)-sulphonamide and N,N-di-(β-hydroxyethyl)-sulphonamide, substituted or unsubstituted phenylazo or naphthylazo, acylamino, such as formylamino, acetylamino or benzoylamino, benzenesulphonamide, p-toluenesulphonylamino, methanesulphonylamino, carboxymethoxyamino, carboethoxyamino, dimethylaminosulphonylamino and carboisopropoxyamino groups, as well as by reactive groups.

As examples of primary heterocyclic amines which can be used for the manufacture of the azo compounds there may be mentioned: 2-aminopyridine, 2-aminoquinoline, 2-aminobenzthiazole, 2-amino-6-methoxy-benzthiazole, 2-amino-6-nitro-benzthiazole, 3-amino-indazole, 3-amino-6-chloroindazole, 3-amino-6-methoxy-indazole, 7-amino-indazole, 7-amino-4-nitro-indazole, 5-aminotriazole-3-carboxylic acid, 3-amino-4-phenyl-5-methylpyrazole, 4-amino-benztriazole, 7-amino-5-chloro-benzimidazole, 4-amino-5-chloro-benzthiazole, 2-aminothiazole, 2-amino-4-methyl-thiazole, 3-amino-1,2,4-triazole, 5-amino-1,2,4-triazole, 1-phenyl-2,3-dimethyl-4-aminopyrazol-5-one, 5-amino-2-phenyl-1,3,4-thiadiazole, 5-amino-3-phenyl-1,2,4-thiadiazole, 8-aminoquinoline, 8-aminoquinoline-5-sulphonic acid, 5-chloro-8-aminoquinoline, 5-acetylamino-8-aminoquinoline, 2-methyl-8-aminoquinoline, 4-aminoacridine, 1-aminocarbazole, 2-amino-5-nitro-thiazole, 5-amino-3-pyridyl-1,2,4-thiadiazole, 5-bromo-8-aminoquinoline 4-amino-3-methyl-pyryzolone(5), 5,7-dibromo-8-amino-quinoline, 8-amino-5-(4'-sulphophenylazo)-quinoline, 5-(2'-sulpho-5'-α,β-dibromopropionylamino-1'-phenylazo)-8-aminoquinoline, 2-amino-5-methylthio-1,3,4-thiadiazole, 2-amino-5-ethylthio-1,3,4-thiadiazole, 2-amino-5-phenylthio-1,3,4-thiadiazole, 2-amino-5-cyclohexylthio-1,3,4-thiadiazole, 2-amino-5-methylsulphonyl-1,3,4-thiadiazole, 2-amino-5-methyl-1,3,4-thiadiazole, 2-amino-5-acetylamino-1,3,4-thiadiazole, 2-amino-5-phenylsulphonyl-1,3,4-thiadiazole, 2-amino-5-chloro-1,3,4-thiadiazole, 2-amino-5-carbomethoxyethyl-1,3,4-thiadiazole, 3-amino-2,1-benzisothiazole, 3-amino-5-methyl-2,1-benzisothiazole, 3-amino-4-ethyl-2,1-benzisothiazole, 3-amino-4,7-dimethyl-2,1-benzisothiazole, 3-amino-4-methoxy-2,1-benzisothiazole, 3-amino-5-, -6- or -7-chloro-2,1-benzisothiazole, 3-amino-5,7-dichloro or -dibromo-2,1-benzisothiazole, 3-amino-4-, -5-, -6- or -7-bromo-2,1-benzisothiazole, 3-amino-5- or -6-cyano-2,1-benzisothiazole, 3-amino-4,6-dichloro-5-cyano-2,1-benzisothiazole, 3-amino-7-chloro-5-cyano-2,1-benzisothiazole, 3-amino-5-chloro-7-cyano-2,1-benzisothiazole, 3-amino-4-methyl-6-cyano-2,1-benzisothiazole, 3-amino-4-, -5-, -6- or -7-nitro-2,1-benzisothiazole, 3-amino-5,7-dinitro-2,1-benzisothiazole, 3-amino-5-nitro-7-chloro-2,1-benzisothiazole, 3-amino-5-nitro-7-bromo-2,1-benzisothiazole, 3-amino-5-(N-methyl-sulphonamido)-2,1-benzisothiazole, 3-amino-5-(N,N-dimethylsulphonamido)-2,1-benzisothiazole and 3-amino-5-methylsulphonyl-2,1-benzisothiazole.

Suitable coupling components are especially 2-amino-3-hydroxypyridine and 5-bromo- or 5-chloro-2-amino-3-hydroxypyridine. Heavy metal complexes which contain one or more reactive groups can be manufactured by using diazo components or coupling components which already contain reactive groups. In many cases it is, however, also possible to introduce reactive groups subsequently into the azo compounds. The introduction can take place after coupling or after metallisation. Compounds of particular interest are those which contain a 6-membered heterocyclic radical bonded via an amino group or an aliphatic reactive radical containing not more than three carbon atoms.

The introduction of the reactive radical is preferably effected by acylation of corresponding azo compounds which contain an acylatable amino group, or of corresponding diazo components which in addition to the amino group to be diazotised also contain a further acylatable amino group, or a group such, for example, as the nitro group or the acetylamino group, which can be converted, for example by reduction of saponification, into an acylatable amino group.

As such compounds, there should especially be mentioned heterocyclic diazo components which contain an aminoarylazo group, such as, for example, 5-(3'-amino-4'-sulphophenylazo)-8-amino-quinoline, 5-(4'-amino-2'-sulphophenylazo)-8-amino-quinoline or 5-(4'-amino-2',5'-disulphophenylazo)-8-amino-quinoline, which can be converted into reactive diazo components by acylation of the amino group bonded to the phenyl radical.

Suitable azo compounds into which reactive radicals can be introduced (i.e. after coupling or metallisation) are, for example, according to the invention the coupling products of the above cited diazo components with halogeno-2,3-dihydroxypyridines. Depending on the starting substances, heavy metal complexes may also be formed which contain more than one reactive group in the finished compound.

As acylating agents which contain a reactive radical in addition to the acylating position, it is in particular possible to use the halides or anhydrides of organic acids which contain easily replaceable atoms or groups of atoms.

As acylating agents which contain a reactive radical, the following may, for example, be mentioned: chloroacetyl chloride or bromoacetyl chloride, β-chloropropionyl chloride or β-bromopropionyl chloride, α,β-dichloropropionyl chloride or α,β-dibromopropionyl chloride, chloromaleic anhydride, carbyl sulphate, acrylyl chloride, β-chloroacrylyl chloride or β-bromoacrylyl chloride, α-chloroacrylyl chloride or α-bromoacrylyl chloride, α,β-dichloroacrylyl chloride or α,β-dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro-4-chlorobenzene-sulphonic acid chloride or -carboxylic acid chloride, 2,2,3,3-tetrafluorocyclobutane-1-carboxylic acid chloride, β-chloroethylsulphonylendomethylene-cyclohexanecarboxylic acid chloride, acrylylsulphonyl-endomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 2,4-dichloro-5-chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro14-trichloromethylpyrimidine or especially 2,4-dimethanesulphonyl-5-chloro-6-methylpyrimidine, 2,4,6-trimethanesulphonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloro-pyrimidine-5-carboxylic acid chloride, 2,6-dichloro- or 2,6-dibromopyrimidine-4- or -5-carboxylic acid amide or -sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro (-tribromo or -trifluoro)-1,3,5-triazines, as well as 4,6-dichloro (-dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a $NH_2$ group or by the radical of an aliphatic, heterocyclic or aromatic amino compound bonded via the nitrogen atom. As such compounds, the radicals of which can be bonded to the triazine nucleus in the 2-position by reaction with trihalogenotriazines, the following may for example be mentioned: aliphatic or aromatic mercapto compounds or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethane-sulphonic acid, but above all aromatic amines, such as aniline, N-methylaniline, toluidines, xylidines, chloroanilines, p- and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline-ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid, and also coloured compounds, or compounds possessing dyestuff character, for example 4-nitro-4'-aminostilbenedisulphonic acid, 2-nitro-4'-aminodiphenylamino-4,3'-stilbene-disulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine radical can also take place after the condensation with the starting diamine or after the reaction, according to the invention, to give the azo compound.

Apart from the fibre-reactive radicals which can be introduced by acylation, further fibre-reactive radicals which may be mentioned are, for example, the vinylsulphone, β-sulphatoethylsulphone or β-thiosulphatoethylsulphone, β-thiosulphatopropionylamide, β-thiosulphatoethylsulphonylamide, or sulphonic acid-N,β-sulphatoethylamide group, which are introduced into the diazo component in a different manner, for example by ester formation or thioester formation.

As compounds which contain a fibre-reactive radical which cannot be introduced by acylation, and in which the fibre-reactive radical is thus preferably not bonded via an amino group but is directly bonded to the benzene radical, the sulpho-esters of the following sulphones may, in particular, be mentioned: 1-amino-2-methoxy-5-(β-hydroxyethyl)-phenylsulphone, 1-aminobenzene-3- or -4-β-hydroxyethylsulphone, 1-amino-2-methyl-benzene-5-β-hydroxyethylsulphone, 1-amino-4-(β-hydroxyethylsulphonylpropionylaminomethyl)-benzene, 1-amino-4-(β-hydroxyethylsulphonylamino)-benzene, and also reactive compounds obtainable via corresponding methylols by Einhorn's method, such as, for example, 1-amino-4-chloroacetylaminomethylbenzene or 1-amino-3-chloroacetylaminomethyl-benzene-6-sulphonic acid.

The condensation with the acid halides or anhydrides or with the heterocyclic halogen compounds is appropriately carried out in the presence of acid-binding agents such as, for example, sodium carbonate or sodium hydroxide, and under such conditions that an unsaturated bond or a replaceable halogen atom still remains in the final product, that is to say, for example, in organic solvents or at relatively low temperatures in aqueous media.

The metal-containing, especially copper-containing, cobalt-containing or nickel-containing, azo compounds obtainable according to the present process and its variants are new; they are suitable for dyeing and printing the most diverse substances, but above all for dyeing animal materials, such as silk, leather and especially wool, though they are also suitable for dyeing and printing synthetic fibres of polyamides or polyurethanes, polyacrylonitrile fibres and the like.

The complexes having one or more sulphonic acid groups are especially suitable for use as dyestuffs for wool, silk, leather and especially polyamides. The complexes containing sulphonamide groups can be used as lake-forming dyestuffs and as dyestuffs for the spin dyeing of polyamides. If the complexes which possess a fibre-reactive group contain two or more sulphonic acid groups, they can be employed as reactive dyestuffs in the usual manner; if sulphonic acid groups are entirely absent, the products are reactive dispersion dyestuffs.

The heavy metal complexes according to the invention which contain a cationic charge can especially be used as dyestuffs for polyacrylonitrile fibres.

The new dyestuffs can be used for dyeing nitrogen-containing fibres, such as wool, for example from an acetic to a neutralbath, and, optionally, that is to say when using dyestuffs which are only sparingly soluble in water, with the addition of suitable dispersing agents. Especially when using complexes of good solubility in water, that is to say containing two or more sulpho groups in the azo compound, dyeing is appropriately carried out with the addition of the assistants customary in dyeing practice.

Furthermore, nitrogen-containing fibres,, especially wool, can be dyed advantageously with the dyestuffs manufactured according to the present process if the fibres are treated, appropriately in a continuous process, for example on a padder, with an aqueous preparation which contains a wool dyestuff and an assistant which, with water and optionally with additives, is capable of forming a system of two liquid phases with a miscibility gap wherein the ratio of the water, optionally containing additives, and the assistant lies within the miscibility gap or near it, the miscibility gap being already present at a relatively low content of assistants, and over a large range of the miscibility gap the phase which contains more assistant accounts for a substantial part, and thereafter the material provided with the aqueous preparation is subjected to a heat treatment.

The dyeings and prints obtainable with the new dyestuff are as a rule distinguished by levelness, resistance to acid and alkali, good fastness to light and good fastness to rubbing; as a rule, they hardly change their appearance in artificial light, and in part they show very interesting and valuable shades.

The new dyestuffs yield particularly pure shades when dyeing polyamide fibres, especially when dyeing material of nylon-6,6.

In the examples which follows the parts, unless otherwise stated, denote parts by weight, and the percentages denote percentages by weight. The relationship of parts by weight to parts by volume is the same as of the gram to the cm³.

EXAMPLE 1

22.4 parts of 8-amino-quinoline-5-sulphonic acid are diazotised indirectly in known manner and then coupled with 11 parts of 2-amino-3-hydroxypyridine. The resulting monoazo dyestuff of the following constitution

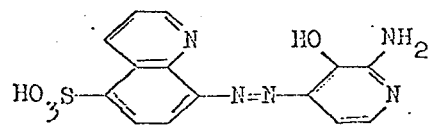

is precipitated from the coupling mixture by addition of sodium chloride, isolated by filtration and dried in vacuo.

6.9 parts of the resulting dyestuff are dissolved in 200 parts of water at 80°C in a neutral reaction. After addition of a solution of 5 parts of copper sulphate pentahydrate and 5 parts of crystallised sodium acetate in 50 parts of water, the mixture is further stirred for 30 minutes at 80°C. The originally reddish violet starting dyestuff is now in the form of a clear solution of the blue 1:1 copper complex and is precipitated by addition of sodium chloride, isolated by filtration and dried.

Polyamide fibres are dyed from a slightly acid bath in pure, reddish blue shades of good fastness properties.

If in the same procedure 6 parts of nickel sulphate heptahydrate, or 3 parts of cobalt-II-sulphate heptahydrate, are used instead of copper sulphate, the corresponding nickel or cobalt complex is formed with which it is possible to dye polyamide fibres from a slightly acid bath in pure, greenish blue shades.

6.9 parts of the above mentioned dyestuff and 20 parts by volume of a normal sodium hydroxide solution are stirred together in 200 parts of water of 80°C. Upon addition of 30 parts by volume of a solution of sodium disalicylatochrominate-III (with a content of 3 percent by weight of $Cr_2O_3$), the reaction mixture is kept at the boil with stirring until the starting dyestuff can no longer be detected. The resulting readily water soluble 1:2 chromium complex is obtained by evaporating the solution. It dyes polyamide fibres from a slightly acid bath in fast blue shades.

EXAMPLE 2

14.4 parts of 8-amino-quinoline are diazotised in kown manner and subsequently coupled with 11 parts of 2-amino-3-hydroxypyridine in alkaline solution. The completely precipitated monoazo dyestuff of the following constitution

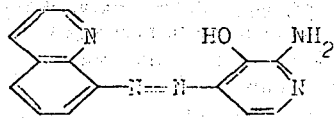

is isolated by filtration, washed with water and dried in vacuo.

26.5 parts of the resulting dyestuff are stirred in 200 parts of glacial acetic acid. After addition of 13 parts of cobalt-II-acetate tetrahydrate, the reaction mixture is heated to 70°–80°C and stirred at this temperature until complete metallisation has occured, in the process of which the colour changes from reddish violet to violet blue. The solvent is evaporated in vacuo and the residue ground to give the 1:2 cobalt complex of the above dyestuff in the form of a metallic bronzy powder, which dissolves readily in water to give a pure blue shade.

The first two columns of the following table list diazo and diazo coupling components from which, according to the preceding Example, it is possible to obtain azo compounds which are reacted with the metals listed in the third column to give complexes which produce dyeings on polyamide in the shade indicated in the fourth column.

| No. | I | II | III | IV |
|---|---|---|---|---|
| 1 | 8-amino-quinoline | Br—pyridine—OH,NH₂ | copper | bluish violet |
| 2 | " | " | nickel | violet blue |
| 3 | " | " | cobalt | blue |
| 4 | methyl-8-amino-quinoline | Br—pyridine—OH,NH₂ | copper | bluish violet |
| 5 | " | " | nickel | violet blue |
| 6 | " | " | cobalt | blue |

-Continued
| No. | I | II | III | IV |
|---|---|---|---|---|
| 7 | " | " | chromium | greyish blue |
| 8 | 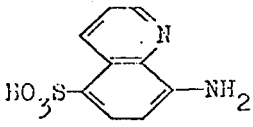 | 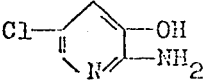 | copper | blue |
| 9 | " | " | nickel | greenish blue |
| 10 | 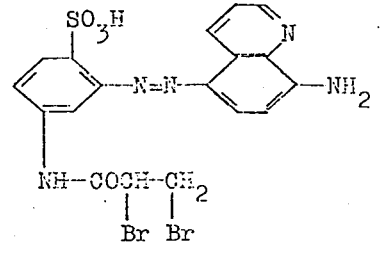 | 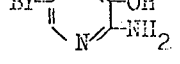 | copper | blue |
| 11 | " | " | nickel | greenish blue |
| 12 | " | " | cobalt | green |
| 13 | 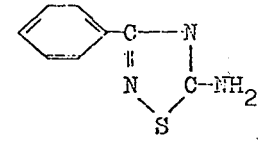 | " | cobalt | violet |
| 14 | 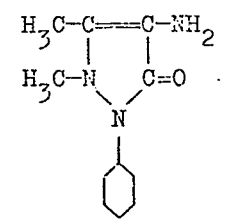 | " | copper | claret |
| 15 | " | " | nickel | reddish violet |

| No. | I | II | III | IV |
|---|---|---|---|---|
| 16 | 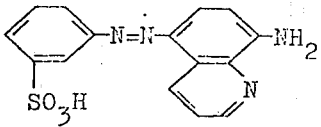 | 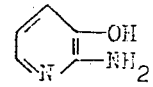 | copper | greenish blue |
| 17 | " | " | nickel | greenish blue |
| 18 | " | " | cobalt | green |
| 19 | 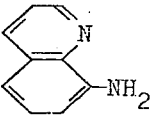 | 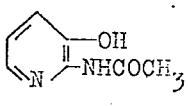 | copper | reddish violet |
| 20 | " | " | nickel | blue |
| 21 | " | " | cobalt | violet blue |
| 22 | 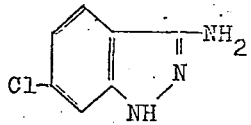 | 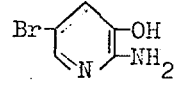 | copper | violet |
| 23 | " | " | nickel | reddish violet |
| 24 | " | " | cobalt | blue |
| 25 | 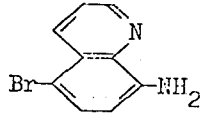 | 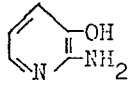 | copper | blue |
| 26 | " | " | nickel | greenish blue |
| 27 | 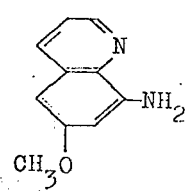 | 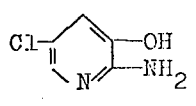 | copper | blue |

| No. | I | II | III | IV |
|---|---|---|---|---|
| 28 | " | " | nickel | greenish blue |
| 29 | " | " | cobalt | bluish green |
| 30 | HO₃S-[quinoline]-NH₂ | Br-[pyridine]-OH, NH₂ | copper | blue |
| 31 | " | " | nickel | blue |
| 32 | " | " | cobalt | greenish blue |
| 33 | " | " | chromium | blue |
| 34 | HN-N=N-[benzotriazole with NH₂ and HO₃S] | [pyridine]-OH, NH₂ | copper | violet |
| 35 | " | " | nickel | reddish violet |
| 36 | " | " | cobalt | reddish violet |
| 37 | [benzothiazole]-C-NH₂ | [pyridine]-OH, NH₂ | copper | violet |
| 38 | " | " | nickel | violet |
| 39 | " | " | cobalt | violet |
| 40 | Br-[quinoline]-NH₂, Br | [pyridine]-OH, NH₂ | copper | blue |
| 41 | " | " | nickel | blue |
| 42 | " | " | cobalt | greenish blue |
| 43 | NO₂-C(=N-CH)-S-C-NH₂ | [pyridine]-OH, NH₂ | copper | blue |
| 44 | " | " | nickel | violet blue |
| 45 | " | " | cobalt | greenish blue |

DIRECTIONS FOR DYEING WOOLLEN FABRIC

At a temperature of 50° to 60°C, 100 parts of woollen fabric are put into a dyebath consisting of 3000 parts of water, 5 parts of 40 % acetic acid, 10 parts of sodium sulphate, 2 parts of the ethylene oxide addition product whose manufacture is described hereinbelow, and 1 part of the 1:2 cobalt complex mentioned in Example 1. After the bath has been heated to the boil within half an hour dyeing is carried out for a further hour at boiling temperature. After rinsing and drying the fabric there results a level greenish blue dyeing.

The ethylene oxide addition product may be manufactuee as follows:

100 Parts of industrial oleylamine are treated with 1 part of finely divided sodium and the mixture is heated to 140°C, when ethylene oxide is passed in at 135° to 140°C. As soon as the ethylene oxide has been rapidly taken up the reaction temperature is lowered to 120°–125°C and the passing in of ethylene oxide is continued until 113 parts of it have been taken up. The thus obtainable reaction product dissolved to a practically clear solution in water.

DIRECTIONS FOR DYEING POLYAMIDE

At a temperature of 50° to 60°C, 100 parts of nylon 6,6 fabric are put into a dyebath consisting of 3000 parts of water, 5 parts of 40 % acetic acid, 10 parts of sodium sulphate and 1 part of the copper complex mentioned in Example 1. After the bath has been heated to the boil within half an hour dyeings is carried out for a further hour at boiling temperature. After rinsing and drying the fabric there results a level greyish blue dyeing.

INSTRUCTION FOR DYEING WOOLLEN KNITWEAR 100 parts of woollen knitwear are put into a dyebath containing 3000 parts of water, 5 parts of ammonium sulphate and 1 part of the nickel complex described in Example 31 of the table. The bath is heated to the boil over the course of half an hour and dyeing is carried out for a further half an hour at boiling temperature. The goods are then rinsed and dried. A level pure blue dyeing is obtained.

INSTRUCTION FOR DYEING POLYACRYLONITRILE

A dyebath consisting of 2000 parts of water, 3 parts of acetic acid (40%), 1 part of sodium acetate, 10 parts of sodium sulphate and 1 part if the 1:2 cobalt somplex described in Example 2 is prepared in a dyeing autoclave. At a temperature of 50°C, 100 parts of a fabric of Orlon 42 staple fibre material is put into this bath. After the apparatus has been sealed, the bath is heated to 120°C within 30 minutes and dyeing is carried out for 1 hour at this temperature. After the usual finishing a deep blue dyeing of very good fastness properties is obtained.

We claim:

1. The iron, cobalt, chromium, copper or nickel complex of a compound of formula

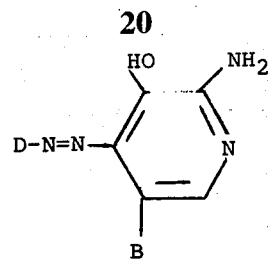

in which:

B is hydrogen, bromine or chlorine

D is pyridyl; benzthiazolyl or benzthiazolyl substituted by methoxy, nitro or chloro; indazolyl or indazolyl substituted by chloro or nitro; triazolyl or triazolyl substituted by carboxyl; benztriazolyl or benztriazolyl substituted by sulfo; pyrazolyl or pyrazolyl substituted by methyl and phenyl; benzimidazolyl or benzimidazolyl substituted by chloro; thiazolyl or thiazolyl substituted by methyl or nitro; pyrazolyl-5-one or pyrazolyl-5-one substituted by methyl or methyl and phenyl; guinolinyl or quinolinyl substituted by sulfo, chloro, bromo, acetylamino, methyl, sulfophenylazo or sulfophenylazo where the phenyl moiety contains a fibre-reactive group bound via an amino group selected from chloroacetylamino, bromoacetylamino, $\beta$-chloropropionylamino, $\beta$-bromopropionylamino, $\alpha,\beta$-dichloropropionylamino, $\alpha,\beta$-dibromopropionylamino, acrylamino, $\beta$-chloroacrylamino, $\beta$-bromoacrylamino, $\alpha$-chloroacrylamino, $\alpha$-bromoacrylamino, $\alpha,\beta$-dichloroacrylamino, $\alpha,\beta$-dibromoacrylamino, trichloroacrylamino, chlorocrotonylamino, propiolylamino, dichlorotriazinylamino, dibromotriazinylamino, or chloro- or bromo-triazinylamino substituted in the 2-position by phenyl, methyl, ethyl, phenylthio, methoxy, ethoxy, isopropoxy, phenoxy, chlorophenoxy, nitrophenoxy, carboxylphenoxy, sulfophenoxy, amino, methylamino, ethylamino, isopropylamino, methoxyethylamino, methoxypropylamino, dimethylamino, benzylamino cyclohexylamino, phenylamino, N-methyl-N-phenylamino methylphenyleneamino, chlorophenyleneamino, hydroxyphenyleneamino, methoxyphenyleneamino or sulfophenyleneamino; acridinyl; carbazolyl; 1,3,4-thiadiazolyl or 1,2,4-thiadiazolyl substituted by pyridyl or phenyl; 1,3,4-thiadiazolyl or 1,3,4-thiadiazolyl substituted by phenyl, methylthio, ethylthio, phenylthio, cyclohexylthio, phenylsulfonyl, methylsulphonyl, methyl, chloro, acetylamino, or carbomethoxyethyl; benzisothiazolyl or benzisothiazolyl substituted by methyl, ethyl, methoxy, chloro, bromo, cyano nitro, methylsulphonyl, N-methylsulfonamide and N,N-dimethylsulfonamide.

2. A compound according to claim 1 in which D is benzthiazolyl or benzthiazolyl substituted by methoxy, nitro or chloro; thiazolyl or thiazolyl substituted by methyl or nitro; 1,2,4-thiadiazolyl or 1,2,4-thiadiazolyl substituted by pyridyl or phenyl; 1,3,4-thiadiazolyl or 1,3,4-thiadiazolyl substituted by phenyl, methylthio, ethylthio, phenylthio, cyclohexylthio, phenylsulfonyl, methylsulphonyl, methyl, chloro, acetylamino or carbomethoxyethyl; quinolinyl or quinolinyl substituted by sulfo, chloro, bromo, acetylamino, methyl, methoxy, sulfophenylazo or (sulfo, α,β-dibromopropionylamino) phenylazo.

3. A compound according to claim 1 which is the heavy metal complex of a compound of formula

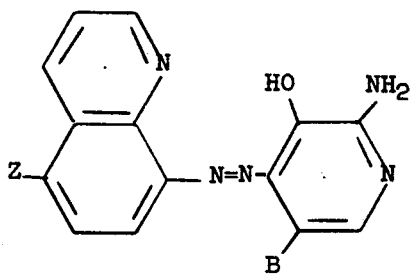

in which:

B is hydrogen, chloro or bromo

Z is sulfo, chloro, bromo, acetylamino, methyl, methoxy, sulfophenylazo or (sulfo, α,β-dibromopropionylamino) phenylazo.

4. A compound according to claim 1 in which the heavy metal is chromium, cobalt, copper or nickel.

5. A compound according to claim 1 which contains 1 or 2 molecules of azo compound per atom of heavy metal.

* * * * *

UNITED STATES PATENT OFFICE
CERTIFICATE OF CORRECTION

PATENT NO. : 3,875,139
DATED : April 1, 1975
INVENTOR(S) : BACK ET AL.

It is certified that error appears in the above-identified patent and that said Letters Patent are hereby corrected as shown below:

Column 20, line 47 after the word carbazolyl, delete "1,3,4-thiadiazolyl" and change to -- 1,2,4-thiadiazolyl --

Signed and sealed this 1st day of July 1975.

(SEAL)
Attest:

RUTH C. MASON
Attesting Officer

C. MARSHALL DANN
Commissioner of Patents
and Trademarks